United States Patent
Bentley et al.

[11] Patent Number: 5,897,279
[45] Date of Patent: Apr. 27, 1999

[54] FASTENER SCREW WITH SPACER FOR INSTALLING GUTTERS

[76] Inventors: R. William Bentley, 1775 Webster Fairport Rd.; Raymond B. Zito, 1965 Harris Rd., both of Penfield, N.Y. 14526

[21] Appl. No.: 09/041,430

[22] Filed: Mar. 12, 1998

[51] Int. Cl.[6] .............................. F16B 25/00; E05D 13/00
[52] U.S. Cl. ............................... 411/387; 411/411; 52/11
[58] Field of Search .................................. 411/386, 387, 411/424, 411; 52/11

[56] References Cited

U.S. PATENT DOCUMENTS

| | | | |
|---|---|---|---|
| 3,812,639 | 5/1974 | Sygnator | 411/387 |
| 4,862,664 | 9/1989 | Romine | 411/387 |
| 4,881,861 | 11/1989 | Hewison | 411/387 |
| 4,900,208 | 2/1990 | Kaiser | 411/387 |
| 5,678,359 | 10/1997 | Turner . | |

Primary Examiner—Flemming Saether

[57] ABSTRACT

A gutter fastener screw is provided including a body having a cylindrical configuration with a first length and a first predetermined diameter. A tip is included having a second length less than ¼ of the first length. The tip is coupled to a bottom end of the body and includes a screw extent having a second diameter ½ the first diameter with a plurality of threaded screw grooves formed in an outer surface thereof. A drill extent is integrally coupled to a bottom end of the screw extent with a drill bit groove formed in an outer surface thereof.

2 Claims, 3 Drawing Sheets

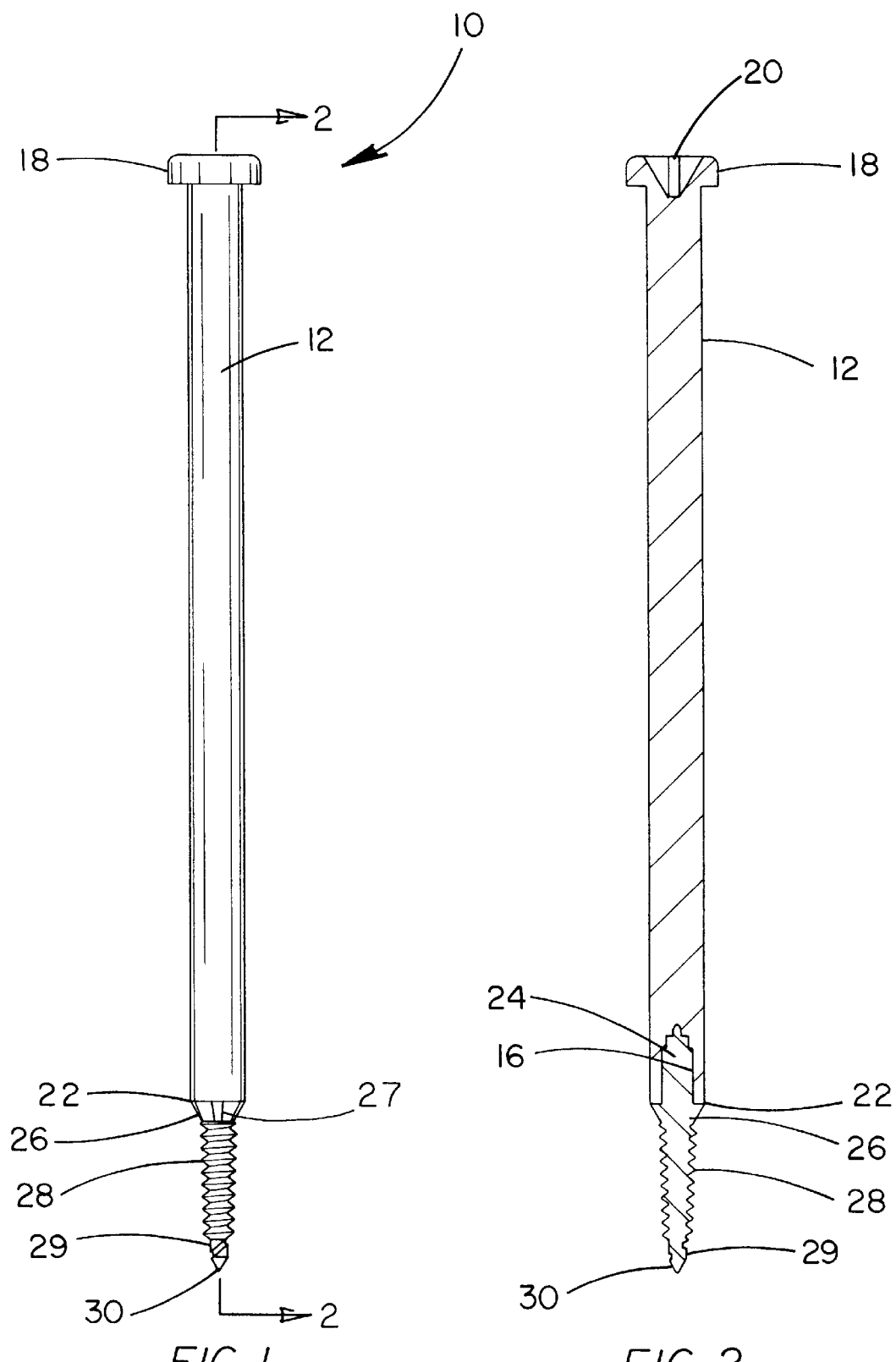

FASTENER SCREW WITH SPACER FOR INSTALLING GUTTERS

BACKGROUND OF THE INVENTION

1. Field of the Invention

The present invention relates to threaded fasteners and more particularly pertains to a new gutter fastener screw for conveniently mounting gutters or the like.

2. Description of the Prior Art

The use of threaded fasteners is known in the prior art. More specifically, threaded fasteners heretofore devised and utilized are known to consist basically of familiar, expected and obvious structural configurations, notwithstanding the myriad of designs encompassed by the crowded prior art which have been developed for the fulfillment of countless objectives and requirements.

Known prior art threaded fasteners include U.S. Pat. No. 5,413,444; U.S. Pat. No. 5,304,023; U.S. Pat. No. 4,518,290; U.S. Pat. No. 4,844,676; U.S. Pat. No. 4,693,654; and U.S. Pat. No. Des. 336,844.

In these respects, the gutter fastener screw according to the present invention substantially departs from the conventional spike and hammer installation concepts and designs of the prior art, and in so doing provides an apparatus primarily developed for the purpose of conveniently mounting gutters or the like.

SUMMARY OF THE INVENTION

In view of the foregoing disadvantages inherent in the known types of threaded fasteners now present in the prior art, the present invention provides a new gutter fastener screw construction wherein the same can be utilized for conveniently mounting gutters or the like.

The general purpose of the present invention, which will be described subsequently in greater detail, is to provide a new gutter fastener screw apparatus and method which has many of the advantages of the threaded fasteners mentioned heretofore and many novel features that result in a new gutter fastener screw which is not anticipated, rendered obvious, suggested, or even implied by any of the prior art threaded fasteners, either alone or in any combination thereof.

To attain this, the present invention generally comprises a smooth aluminum body having a cylindrical configuration with a first length and a first predetermined diameter. As shown in FIG. 2, the aluminum body has a bottom end with an aperture formed therein and a top end with an annular flange integrally coupled thereto. Such flange extends radially from the body to define a disk-shaped head. An upper surface of the head has a Phillips cross-shaped indentation formed therein. Next provided is a hardened steal tip having a second length less than ¼ that of the first length. The steel tip includes a post fixedly secured within the bore of the aluminum body. See FIG. 2. An intermediate extent of the tip is integrally coupled to a bottom end of the post. Such intermediate extent has a frusto-conical configuration with a top end having the first diameter such that a periphery thereof sits flush with that of the bottom end of the aluminum body. A screw extent is integrally coupled to a bottom end of the intermediate extent. As shown in FIGS. 1 & 2, the screw extent has a second diameter ½ the first diameter with a plurality of threaded screw grooves formed in an outer surface thereof. Integrally coupled to a bottom end of the screw extent is a drill extent having a conical bottom end and a drill bit groove formed in an outer surface thereof.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. A tubular spacer, presently used in spike installation, is also used with the gutter fastener screw installation. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new gutter fastener screw apparatus and method which has many of the advantages of the threaded fasteners mentioned heretofore and many novel features that result in a new gutter fastener screw which is not anticipated, rendered obvious, suggested, or even implied by any of the prior art threaded fasteners, either alone or in any combination thereof.

It is another object of the present invention to provide a new gutter fastener screw which may be easily and efficiently manufactured and marketed.

It is a further object of the present invention to provide a new gutter fastener screw which is of a durable and reliable construction.

An even further object of the present invention is to provide a new gutter fastener screw which is susceptible of a low cost of manufacture with regard to both materials and labor, and which accordingly is then susceptible of low prices of sale to the consuming public, thereby making such gutter fastener screw economically available to the buying public.

Still yet another object of the present invention is to provide a new gutter fastener screw which provides in the apparatuses and methods of the prior art some of the advantages thereof, while simultaneously overcoming some of the disadvantages normally associated therewith.

Still another object of the present invention is to provide a new gutter fastener screw for conveniently mounting gutters or the like.

Even still another object of the present invention is to provide a new gutter fastener screw that includes a body having a cylindrical configuration with a first length and a first predetermined diameter. A tip is included having a second length less than ¼ of the first length. The tip is coupled to a bottom end of the body and includes a screw extent having a second diameter ½ the first diameter with a plurality of threaded screw grooves formed in an outer surface thereof. A drill extent is integrally coupled to a bottom end of the screw extent with a drill bit groove formed in an outer surface thereof.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side view of a new gutter fastener screw according to the present invention.

FIG. 2 is a cross-sectional view of the present invention taken along line 2—2 shown in FIG. 1.

DESCRIPTION OF THE PREFERRED EMBODIMENT

Figure 3:
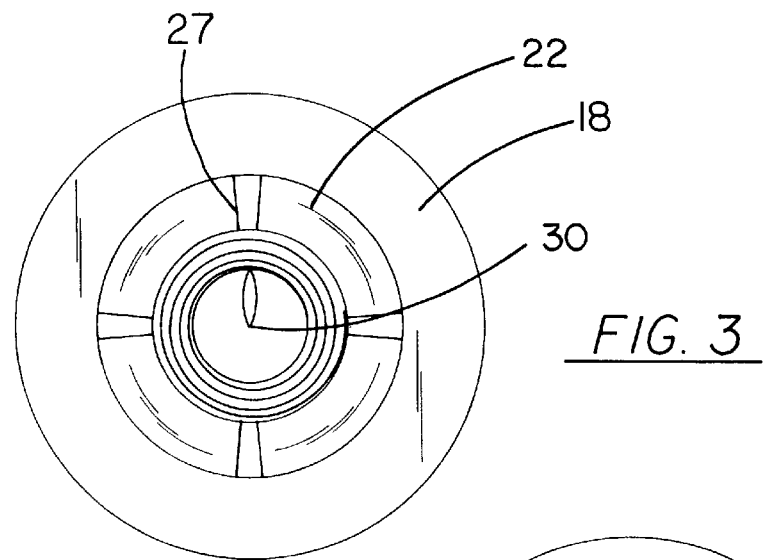
FIG. 3 is a bottom view of the present invention.
Figure 4:
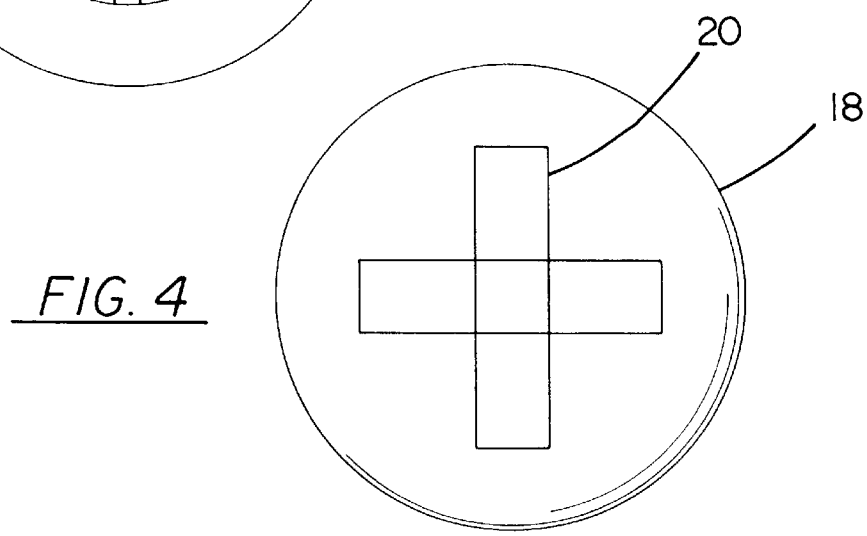
FIG. 4 is a top view of the preferred embodiment of the present invention.
Figure 5:
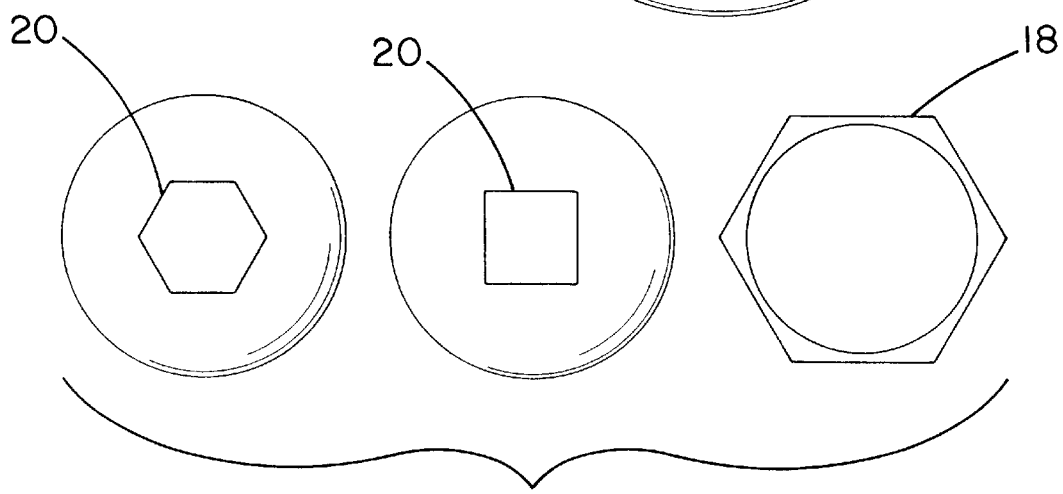
FIG. 5 shows a plurality of alternate embodiments of the head of the present invention.
Figure 6:
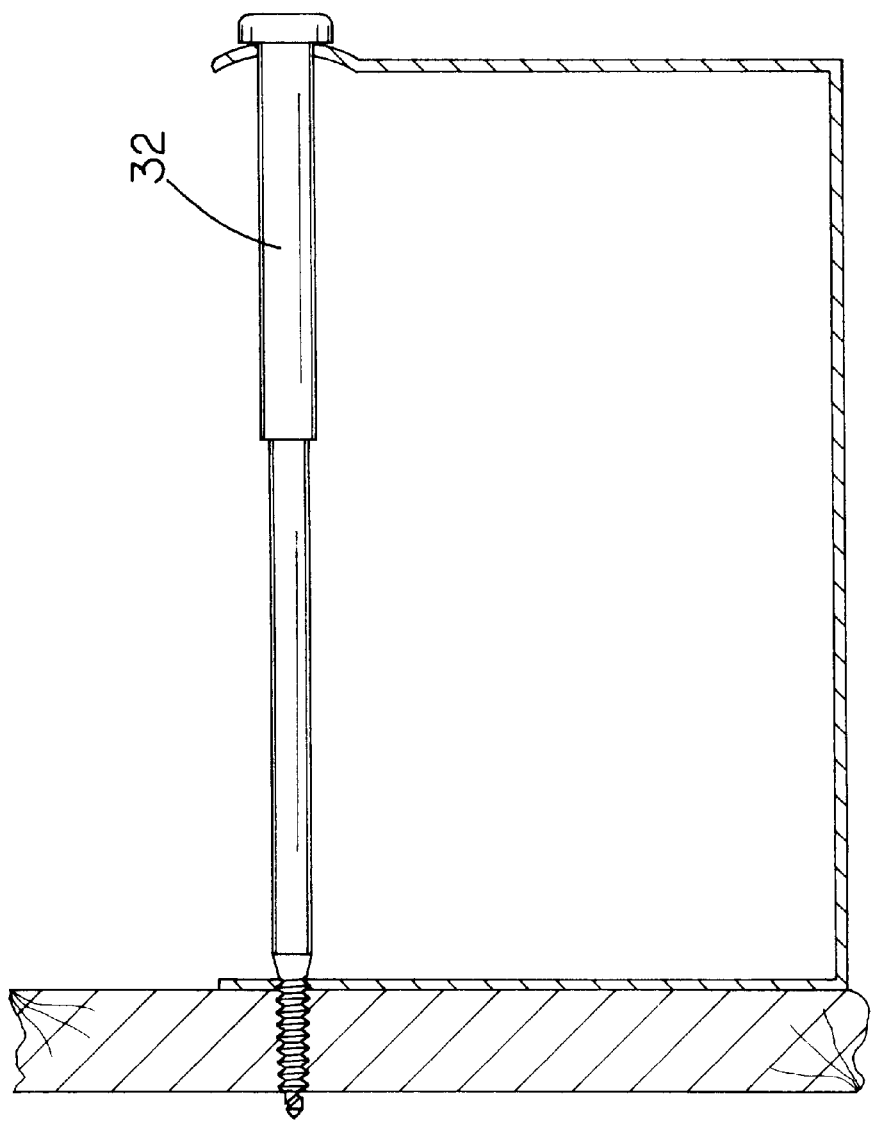
FIG. 6 is a side view of the gutter, the fascia board and the present invention during use.

With reference now to the drawings, and in particular to FIGS. 1 through 6 thereof, a new gutter fastener screw embodying the principles and concepts of the present invention and generally designated by the reference numeral 10 will be described.

The present invention, as designated as numeral 10, includes a smooth aluminum body 12 having a cylindrical configuration with a first length and a first predetermined diameter. As shown in FIG. 2, the aluminum body has a bottom end with an aperture 16 formed therein and a top end with an annular flange 18 integrally coupled thereto. Such flange extends radially from the body to define a disk-shaped head. An upper surface of the head has a Phillips cross-shaped indentation 20 formed therein. In the alternative, the flange may have a hexagonal configuration and the indentation may either form a square or a hexagon.

Next provided is a hardened steal tip 22 having a second length less than ¼ that of the first length. The steel tip includes a post 24 fixedly secured within the bore of the aluminum body. See FIG. 2. Preferably, the post and bore combination have interlocking ridges to prevent rotation with respect to each other. An intermediate extent 26 of the tip is integrally coupled to a bottom end of the post. Such intermediate extent has a frusto-conical configuration with a top end having the first diameter such that a periphery thereof sits flush with that of the bottom end of the aluminum body. The frusto-conical surface has cutter serration(s) 27 necessary for screw body clearance.

A screw extent 28 of the tip is integrally coupled to a bottom end of the intermediate extent. As shown in FIGS. 1 & 2, the screw extent has a second diameter ½ the first diameter with a plurality of threaded screw grooves formed in an outer surface thereof. It should be noted that the screw grooves function to draw the present invention into a recipient surface when rotated. Integrally coupled to a bottom end of the screw extent is a drill extent 29 having a conical bottom end 30 and a drill bit groove formed in an outer surface thereof. The drill extent serves to form a bore in the recipient surface. It should be noted that the drill extent is smooth with the exception of the drill bit groove. In the preferred embodiment, the post extent is less than ½ the screw extent while the drill extent is less than ½ the post extent.

In use, a tubular spacer 32, presently used in spike installation, is also used with the gutter fastener screw installation. A cordless driver may be employed to force the drill extent into the fascia board first, followed by the screw extent. Such continues until the screw head is drawn securely to exterior top flange of gutters and limited by tubular spacer length. Note FIG. 6.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A gutter fastener screw comprising, in combination:

a smooth aluminum body having a cylindrical configuration with a first length and having a first predetermined diameter, the aluminum body having a bottom end with an aperture formed therein and a top end with an annular flange integrally coupled thereto and extending radially therefrom to define a disk-shaped head, an upper surface of the head having an indentation formed therein adapted for being engageable by a tool to produce rotation of the body;

a hardened steel tip having a second length less than about ¼ that of the first length, the steel tip including a post fixedly secured within the bore of the aluminum body with interlocking ridges to prevent rotation of the tip with respect to the body, an intermediate extent integrally coupled to a bottom end of the post and having a frusto-conical configuration with a plurality of diametrically opposed cutter serrations formed thereon and each cutter serration being positioned completely within a plane lying along a central axis of the intermediate extent, and the intermediate extent further comprising a top end having the first diameter such that a periphery thereof sits flush with that of the bottom end of the aluminum body, a screw extent integrally coupled to a bottom end of the intermediate extent and having a second diameter measuring about ½ of the first predetermined diameter with a plurality of threaded screw grooves formed in an outer surface thereof, and a smooth drill extent integrally coupled to a bottom end of the screw extent with a diameter less than that of the screw extent, wherein the drill extent has a cylindrical top part and a conical bottom part and a serpentine drill bit groove formed in an outer surface thereof for forming a hole in a surface when the tip is rotated against the surface;

wherein a length of the post extent is less than about ½ that of the screw extent while the drill extent has a length that is less than about ½ that of the post extent; and a spacer for limiting an extent to which the screw can be inserted into a fascia board.

2. A gutter fastener screw comprising, in combination:

a gutter with an exterior top flange, wherein the gutter is positioned on a fascia board;

a smooth aluminum body having a cylindrical configuration with a first length and having a first predetermined diameter, the aluminum body having a bottom end with an aperture formed therein and a top end with an annular flange integrally coupled thereto and extending radially therefrom to define a disk-shaped head, an upper surface of the head having an Phillips cross-shaped indentation formed therein adapted for being engageable by a tool to produce rotation of the body;

a hardened steel tip having a second length less than about ¼ that of the first length, the steel tip including a post fixedly secured within the bore of the aluminum body with interlocking ridges to prevent rotation of the tip with respect to the body, an intermediate extent integrally coupled to a bottom end of the post and having a frusto-conical configuration with a plurality of diametrically opposed cutter serrations formed thereon and each cutter serration being positioned completely within a plane lying along a central axis of the intermediate extent, and the intermediate extent further comprising a top end having the first diameter such that a periphery thereof sits flush with that of the bottom end of the aluminum body, a screw extent integrally coupled to a bottom end of the intermediate extent and having a second diameter measuring about ½ of the first predetermined diameter with a plurality of threaded screw grooves formed in an outer surface thereof, and a smooth drill extent integrally coupled to a bottom end of the screw extent with a diameter less than that of the screw extent, wherein the drill extent has a cylindrical top part and a conical bottom part and a serpentine drill bit groove formed in an outer surface thereof for forming a hole in a surface when the tip is rotated against the surface;

wherein a length of the post extent is less than about ½ that of the screw extent while the drill extent has a length that is less than about ½ that of the post extent;

wherein the screw passes through the exterior top flange of the gutter and into the fascia board; and a spacer for limiting an extent to which the screw is inserted.

\* \* \* \* \*